Figure 1:
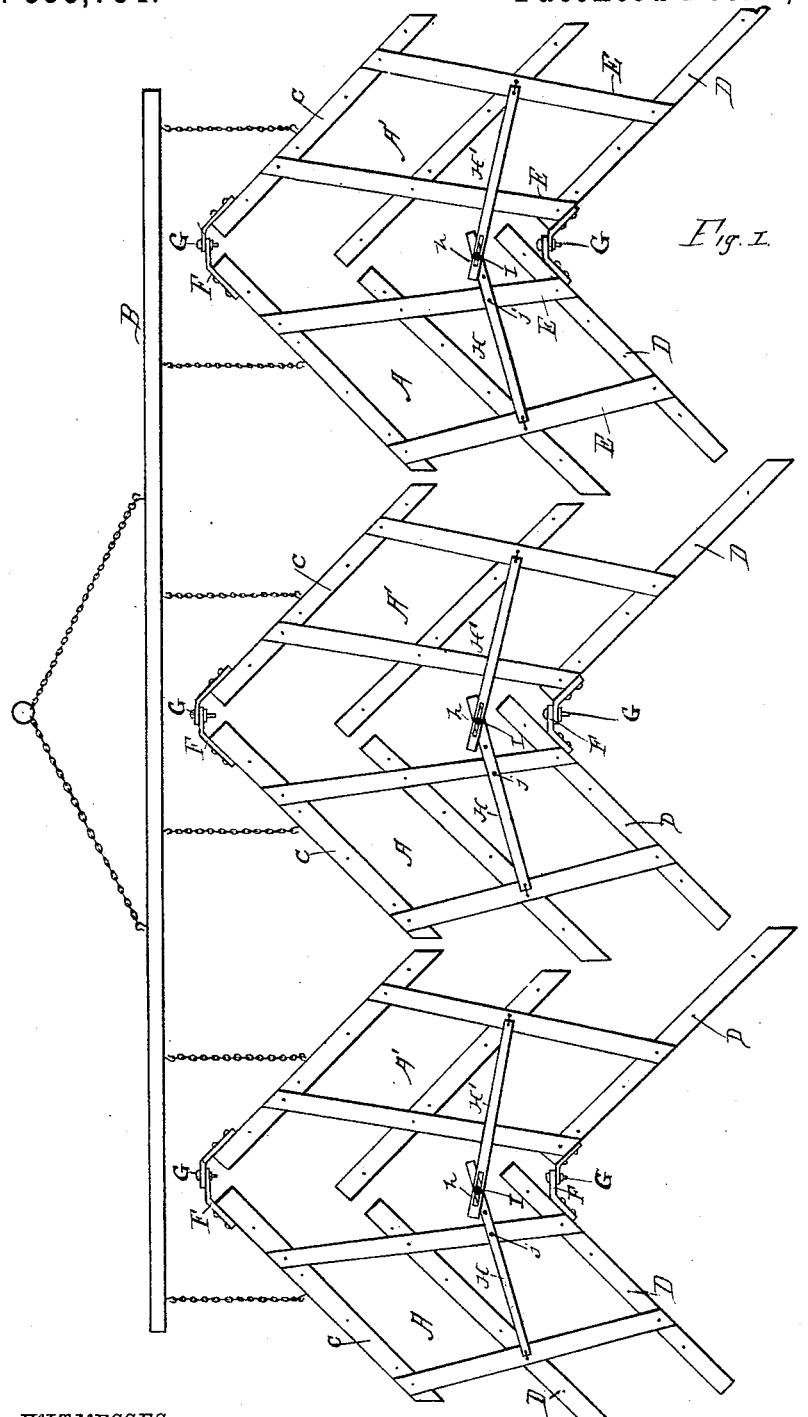

(No Model.) 2 Sheets—Sheet 1.

A. B. CLIPPINGER.
HARROW.

No. 353,734. Patented Dec. 7, 1886.

WITNESSES
INVENTOR (No Model.) 2 Sheets—Sheet 2.
A. B. CLIPPINGER.
HARROW.
No. 353,734. Patented Dec. 7, 1886.
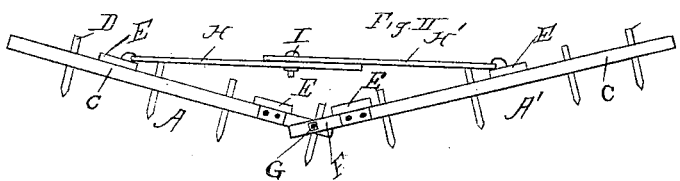
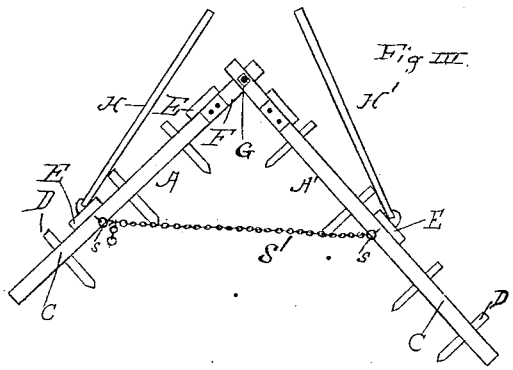
WITNESSES
INVENTOR

UNITED STATES PATENT OFFICE.

AMOS B. CLIPPINGER, OF CENTRALIA, KANSAS.

HARROW.

SPECIFICATION forming part of Letters Patent No. 353,734, dated December 7, 1886.

Application filed March 20, 1886. Serial No. 196,006. (No model.)

*To all whom it may concern:*

Be it known that I, AMOS B. CLIPPINGER, of Centralia, in the county of Nemeha and State of Kansas, have invented certain new and useful Improvements in Harrows; and I do hereby declare the following to be a full, clear, and exact description of the invention, such as will enable others skilled in the art to which it pertains to make and use the same.

My invention relates to harrows, the object being to provide a harrow adapted to be used upon either even or uneven ground, and also adapted for use as a "listing" harrow to work corn in a furrow.

The invention consists in the combination, with the hinged or pivoted sections of a harrow, of adjustable bars for securing said sections at different inclinations.

The invention further consists in the various features of construction and combinations of parts, hereinafter fully described, and pointed out in the claims.

In the accompanying drawings, Figure 1 represents a harrow composed of different independent sections, each constructed in accordance with my invention. Figs. 2 and 3 illustrate parts in detail.

I show in the drawings three different harrows connected to a common coupling-bar, B, and as each of said harrows is constructed similarly to the other a description of one will suffice for both.

The harrow consists of two sections, A and A', each formed of parallel oppositely-inclined beams C, which alternately overlap, carrying the teeth D, and securely braced together by longitudinal bars or braces E. The teeth D are so arranged on the overlapping ends of the beams C that when the harrow is being used as indicated in Fig. 2 a row of teeth will traverse the bottom point of the furrow. The front and rear beams are provided at their inner ends with overlapping metallic straps F F, suitably slotted to receive pivot-bolts G G. Thus the two sections A and A' are pivotally secured together.

H H' represent adjustable securing-bars, the outer ends of which are pivotally secured to the sections A and A', near the outer sides of the latter. The inner ends of these bars H and H' overlap, and are slotted, as shown at $h$, to receive a pin, I, and one or both of said bars are formed with a series of openings, J, to permit various adjustments. As thus constructed, the sections are adapted to be raised at their outer sides to depress their inner sides to conform to the furrow to be worked, and when so raised are secured by the bars H and H'.

It will be apparent that the harrow is also adapted for use upon even ground, and when so used the bars H and H', while not interfering with the necessary free movement of the sections to enable them to pass obstructions, serve to prevent them from doubling up.

In Fig. 3 I show a device for securing the harrow-sections when they are folded toward each other to pass through a gate.

When it is desired to move the harrow after use, I disconnect the bars H and H', and draw the two outer sides of the sections together, and secure them by a chain, S, and rings $s$, secured to the rear beams or other convenient parts. Thus the inner sides of the sections are elevated and the harrow rests upon the outer ends of the beams, as seen in Fig. 3.

Having fully described my invention, what I claim as new, and desire to secure by Letters Patent, is—

The combination, with the section A, having inclined beams, as shown, of the section A', whose beams are inclined oppositely to those of section A, whereby the inner ends of said beams alternately overlap, and the two bars H H', loosely secured at their outer ends to the sections, while their inner ends overlap and have an adjustable connection, the whole being combined and arranged, as described, to cause the inner teeth on the overlapping ends of the sections to traverse the bottom of the furrow made by said sections when they are inclined, and secured by the bars H H', substantially as described.

In testimony whereof I have signed this specification in the presence of two subscribing witnesses.

AMOS B. CLIPPINGER.

Witnesses:
S. D. CLIPPINGER,
F. CLIPPINGER.